3,238,191
PHOSPHONIC ACID ANALOGS OF NUCLEOSIDE PHOSPHATES AND METHOD
Terrell C. Myers, 1354 E. 48th St., Chicago, Ill.
No Drawing. Filed Sept. 13, 1962, Ser. No. 223,527
7 Claims. (Cl. 260—211.5)

This is a continuation-in-part of my copending application Ser. No. 742,011, filed June 16, 1958, now abandoned, entitled "Phosphonic Acid Analogs of Nucleoside Phosphates and Method."

This invention relates to phosphonic acid analogs of nucleoside phosphates and to the method of manufacture of same. It relates more particularly to the phosphonic acid analogs of nucleoside monophosphates, diphosphates and triphosphates in which one or more of the bridge oxygens of the phosphate (—C—O—P—) or pyrophosphate (—P—O—P—) are replaced by a methylene or other aliphatic group (—C—CH$_2$—P), or (—P—CH$_2$—P—)

It is an object of this invention to produce and to provide a method for producing phosphonic acid analogs of nucleoside phosphates in which one or more of the bridge oxygens of the phosphate are replaced with a methylene or other aliphatic group.

The following will illustrate the new and novel compounds prepared in accordance with the practice of this invention:

Analogs of monophosphates

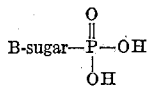   (I)

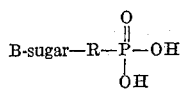   (Ia)

wherein B refers to a "Base" and wherein there is a direct C—P bond.

Analogs of diphosphates

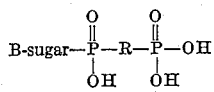   (II)

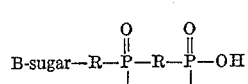   (IIa)

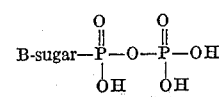   (III)

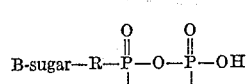   (IIIa)

wherein there is at least one direct C—P bond.

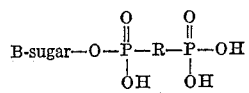   (IV)

wherein there is a direct O—C bond with a carbon in the sugar.

Analogs of triphosphates

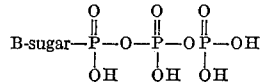   (V)

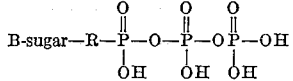   (Va)

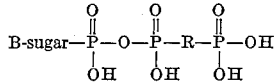   (VI)

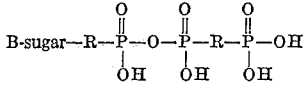   (VIa)

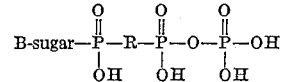   (VII)

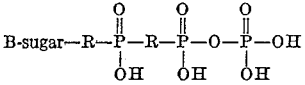   (VIIa)

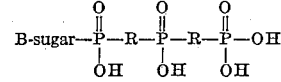   (VIII)

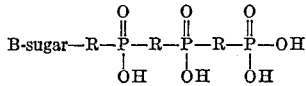   (VIIIa)

wherein there is at least one direct C—P bond or direct R—C bond with a carbon in the sugar.

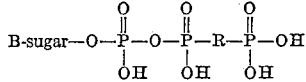   (IX)

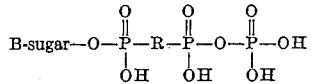   (X)

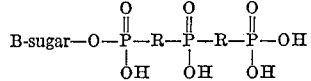   (XI)

wherein there is a direct O—C bond with a carbon in the sugar.

In the above formulations R is an aliphatic functional group of the alkylene type including methylene, ethylene, propylene, butylene and the like, but wherein R is preferably a methylene group. When the R group between the sugar and the phosphate is methylene and the sugar is a pentose, as in the natural occurring bases, the resulting base and nucleoside and nucleoside synthesized thereof is a hexose. As used hereinafter, the term "phosphonate" will embrace the compounds illustrated above and their corresponding derivatives and functionalities.

The term "base" as employed in the foregoing equations, representing compounds prepared in accordance with the practice of this invention, is meant to include the purine or pyrimidine bases of natural nucleoside phosphates. Included amongst the pyrimidine bases are:

Uracil (2,6-dihydroxypyrimidine)

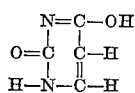

or

Thymine (5-methyluracil)

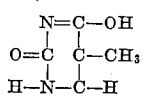

or

Cytosine (2-hydroxy-6-aminopyrimidine)

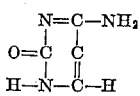

or 5-methylcytosine (2-hydroxy-5-methyl-6-aminopyrimidine)

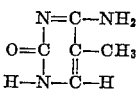

5 hydroxymethylcytosine

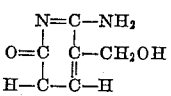

The purine bases comprise the following:
Adenine (6-aminopurine)

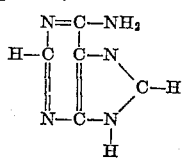

Guanine (2 amino-6-hydroxypurine)

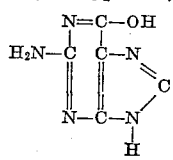

Hypoxanthine

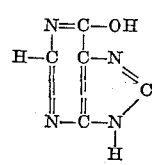

Xanthine

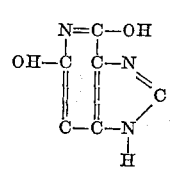

Uric acid

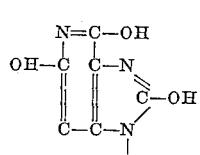

The sugars which attach to the base to form the corresponding nucleosides comprise the pentoses but may also include the hexoses. The more important pentoses joined with the bases in forming glucosides and the corresponding nucleosides embodying the features of this invention comprise ribose and desoxyribose such as D-ribose, D-desoxyribose represented by the following formulae:

Ribose

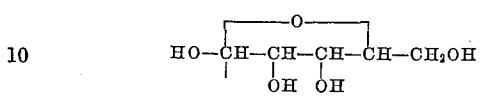

Deoxyribose

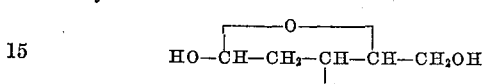

wherein the hydroxy group on the $C_1$ carbon is beta.

The base and the sugar are joined between the nitrogen group in the 9 position of the purine and in the 3 position of the pyrimidine by condensation with the $\beta$-hydroxy group in the $C_1$ position of the sugar, as represented by the following:

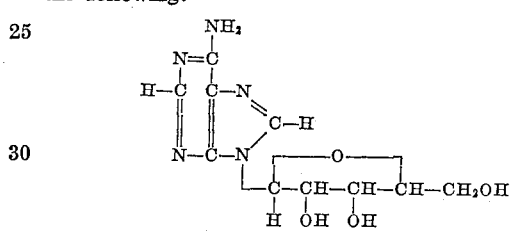

Adenine + ribose → adenosine

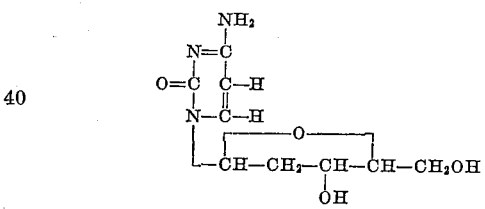

Cytosine + deoxyribose → cytidine

The phosphonic or phosphoric acid attaches to the sugar in the formulation of the nucleoside through one or more of the hydroxy groups in the $C_2$, $C_3$ or $C_5$ position of ribose or the $C_3$ or $C_5$ position of desoxyribose to form the corresponding 2', 3' or 5' phosphonate or combinations thereof, as follows:

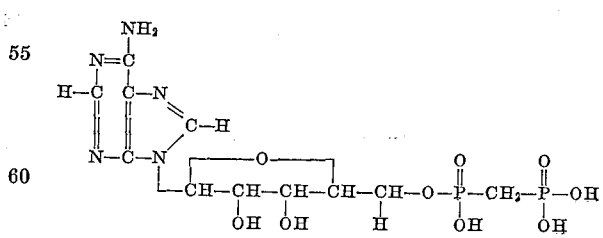

Adenine-9$\beta$-D-ribose-5'-methylenediphosphonate

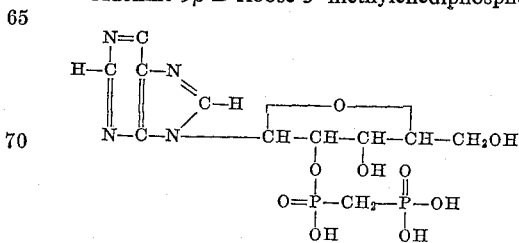

Adenine-9$\beta$-D-ribose-2$\beta$-methylenediphosphate

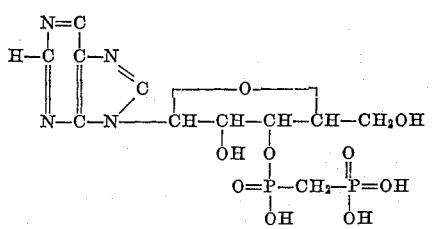

Adenine-9β-D-ribose-3'-methylenediphosphate

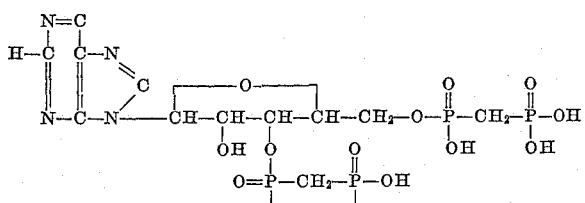

Adenine-9β-D-ribose-3',5'-di(methylenediphosphate)

In the syntheses of the phosphonic acid analogs of the nucleoside phosphates, the nucleoside (base+sugar) or a suitable derivative of the nucleoside is reacted with a suitable derivative of the corresponding phosphonic acid or phosphoric acid respectively to form the corresponding nucleoside derivative. For example, to form the analog of monophosphate, as represented by the Formula Ia, the nucleoside can be joined to an alkylphosphonic (or alkylenephosphonic) acid as represented by methylphosphonic acid

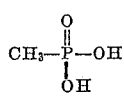

ethylphosphonic acid

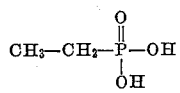

n-propylphosphonic acid

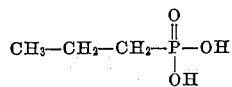

or a substituted alkylphosphonic (or alkylenephosphonic) acid such as chloromethylphosphonic acid

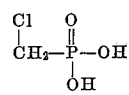

or β-hydroxypropylphosphonic acid

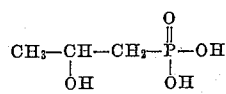

and the like.

To form the analogs of diphosphates, as represented by Formulae II, IIa, III and IIIa, the nucleoside can be joined with an alkylene diphosphonate as represented by —R—P—O—P, —R—P—R—P, wherein R represents an ethylene, methylene, propylene, isopropylene or the like aliphatic group or substituted aliphatic group such as chloromethylene, α-chloroethylene, β-hydroxypropylene, β-chloropropylene and the like and in which the first R may be a part of the sugar group, or a nucleoside phosphate or phosphonate could be reacted with a suitable phosphoric or phosphonic acid or derivative thereof.

Similarly to form the analogs of triphosphates, as represented by Formulae V, Va, VI, VIa, VII, VIIa, VIII and VIIIa, the nucleoside is joined with an alkylene tri-phosphonate as represented by —R—P—O—P—O—P, —R—P—R—P—O—P, —R—P—O—P—R—P, —R—P—R—P—R—P, wherein R represents an organic group of the type described and wherein the first R may be a part of the sugar group or a nucleoside phosphate or phosphonate could be reacted with a suitable phosphoric or phosphonic acid or derivative thereof.

To synthesize the analogs of diphosphates as represented by Formula IV, the nucleoside is joined via derivatives of an alkylene diphosphonic acid as represented by

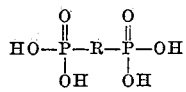

wherein R is an organic group of the type previously described.

Similarly, to synthesize the analog of triphosphate as represented by Formulae IX, X and XI, the nucleoside is reacted with a derivative of an alkylene triphosphoric acid or triphosphonic acid or derivative thereof as represented by

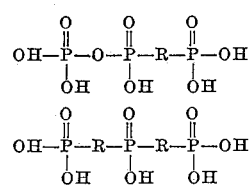

wherein R is an organic group of the type previously described.

It will be understood that in the formulation of the phosphonic acid analogs of the type described, the parent compound may comprise a nucleoside monophosphate reacted with a phosphonic acid or phosphoric acid as previously described but of a lower order for the preparation of corresponding compounds, or a nucleoside phosphonic acid can be reacted with phosphoric acid and phosphonic acid or derivatives thereof.

The reactants for syntheses can thus be supplied by build-up of the basic phosphoric acid or phosphonic acid compounds by reaction one with the other for combination with the base sugar or the corresponding monophosphate or phosphonate. For example, the build-up of the nucleoside diphosphonate may be achieved by reaction of phosphonic acid or phosphoric acid with a base sugar monophosphate or phosphonate. Similarly, the triphosphonate can be built up by reaction of nucleoside monophosphonate or monophosphate with a diphosphoric acid or diphosphonic acid or by reaction of the nucleoside diphosphonate or phosphate with a phosphonic acid or phosphoric acid. The following will outline the various courses which will be followed in the syntheses of phosphonic acid analogs of nucleoside phosphates embodying the features of this invention.

The various phosphonic acid analogs of the nucleoside phosphates can be synthesized from the base sugar phosphate or phosphonate by reaction with Phosphoric acid

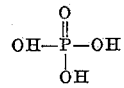 (A)

Methylenediphosphonic acid

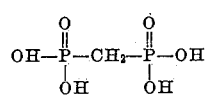 (B)

and derivatives thereof or

Monochloromethylene diphosphonic acid or derivatives thereof

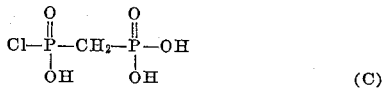

as represented by the following:

SYNTHESES I

The analog of a triphosphate can be synthesized by reaction of a nucleoside monophosphate with methylenediphosphonic acid and derivatives thereof in the presence of a condensing agent such as dicyclohexylcarbodiimide.

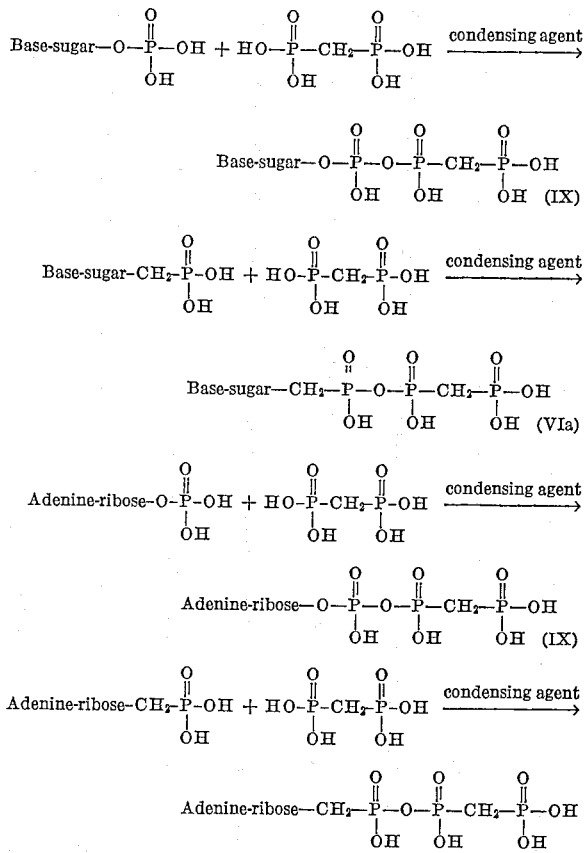

The following is a specific example of syntheses which is given by way of illustration but not by way of limitation. It will be understood that the same reaction conditions can be employed for the preparation of others of the analogs by the substitution of others of the monophosphates or monophosphonates for the adenosine-5'-monophosphate or by the substitution of other phosphonic acids for the methylenediphosphonic acid, as will hereinafter be illustrated by various equations and as will be understood by those skilled in the art.

Example 1

PREPARATION OF ANDENOSINE-5'-PHOSPHATE METHYLENEDIPHOSPHONIC ACID ANHYDRIDE

A mixture of methylenediphosphonic acid (2 g., 0.0137 mole), 30 ml. of freshly distilled pyridine and 4 ml. of water was stirred for 13 hours at room temperature. To the resulting mixture which consisted of two liquid phases, addition was made of adenosine-5'-monophosphate dihydrate (1.0 g., 0.0017 mole). After the adenosine-5'-monophosphate had dissolved, liquid dicyclohexylcarbodiimide (14.4 g., 0.07 mole) was added. The mixture was vigorously stirred at room temperature for about 24 hours. After about 15 minutes, precipitation of dicyclohexylurea had begun to occur and the urea was removed by filtration. The filtrate was extracted several times with ether and then stored in a frozen state at about −20° F. Paper chromatograms (5% disodium hydrogen phosphate-isoamyl alcohol) showed three spots; $P^1,P^2$-diadenosine-5'-pyrophosphate (DAPP), $R_f$ 0.71; adenosine-5'-monophosphate (AMP), $R_f$ 0.68; the desired product, adenosine-5'-monophosphate methylenediphosphonic acid anhydride, $R_f$ 0.81.

The solution was chromatographed in three portions on a Dowex-1 (200–400 mesh-$x_2$, formate) column 25 mm. in diameter x 175 mm. long as described in the following. The solution was placed on the column at pH 8–9, and the column was washed with 1500 ml. of water to remove pyridine. Gradient elution was then employed with the following solutions being successively added to 500 ml. of water in the original mixing chamber; 500 ml. of 4M formic acid; 500 ml. of .1M ammonium formate in 4M formic acid; 1500 ml. of .2M ammonium formate in 4M formic acid. The total elution time was approximately 96 hours. Fractionation was followed by optical density measurements at 260 m$\mu$ with 165 fractions (ca. 15 ml.) being collected.

Three major components were thus separated and examined on paper chromatograms (5% disodium hydrogen phosphate-isoamyl alcohol); adenosine-5'-monophosphate (AMP), fractions 15–20, $R_f$ 0.68; $P^1$, $P^2$-diadenosine-5'-pyrophosphate (DAPP), fractions 25–30, $R_f$ 0.61; adenosine-5'-monophosphate methylenediphosphonic acid anhydride, fractions 120–150, $R_f$ 0.81, $R_{ATP}$ 0.97.

The three fractions of adenosine-5'-monophosphate methylenediphosphonic acid anhydride were combined, lyophilized to dryness and the ammonium formate was removed by vacuum sublimation at 35°. The product was a clean white hydroscopic solid.

*Disodium salt.*—A solution of 70 mg. (as determined by optical density measurements) of product in 1.5 ml. of water was applied at 5° to a column 6 mm. in diameter, of 1.5 gm. of Dowex-50 (hydrogen form) and eluted with 15 ml. of water. The eludant was adjusted to pH 3.5 with sodium hydroxide and lyophilized to produce a white wall defined solid; yield 55 mg.; $R_{ATP}$ 0.97, as a single spot.

*Barium salt.*—One ml. of solution containing 30 mg. of product from the Dowex-1 chromatography was treated with excess 1M barium acetate in a centrifuge tube. The precipitate was spun down and washed with three portions of water. It was redissolved in a minimum of 0.1 N HCl at 5°, centrifuged free from a small amount of insoluble material, and reprecipitated at pH 6 by addition of 0.1 N N$_a$OH. This solid was washed with three portions of water, then with two portions of 45% ethanol, then with ether and dried for 12 hours over P$_2$O$_5$ at 0.1 mm.; yield, 28 mg. A portion was triurated with dilute ammonium sulfate, the barium sulfate was removed by centrifugation and the supernate examined on paper chromatograms (5% sodium dihydrogen phosphate-isoamyl alcohol). This procedure produced a single, well defined spot of $R_{ATP}$ 0.97.

In the Synthesis I, the ingredients react in about an equal molecular ratio but it is preferred to make use of an excess of the phosphonic acid, such for example as the 10 molar excess employed in the foregoing example. Good yields can be secured when the reactants are varied in the ratio of 1 molecular weight of the monophosphate to 1 to 25 molecular weights of the methylenediphosphonic acid. Instead of pyridine, use can be made of other solvents such as dimethyl formamide, acetonitrile, dioxane, tetrahydrofuran, glycol ethers, glycol esters, and the like. Instead of the dicyclohexylcarbodiimide, use can be made of other condensing agents such as represented by the formula R—N=C=N—R', where R and R' are organic radicals such as aliphatic, aromatic, heterocyclic, and the like radicals which may be substituted or unsubstituted, such as 1,3-dicyclohexylcarbodiimide, 1,3-di-p-tolylcarbodiimide. Use can also be made of trifluoracetic acid anhydride, ketooxamine sulfonates, or compounds of the type HC≡C—O—CH₂CH₃.

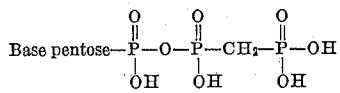 (VI)

can be prepared by the substitution of

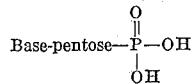

for the adenosine monophosphate for reaction with

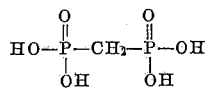

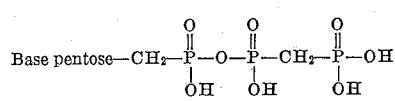 (VIa)

can be prepared by the substitution of

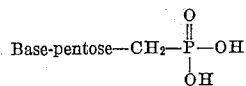

for the adenosine monophosphate in the above example for reaction with

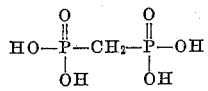

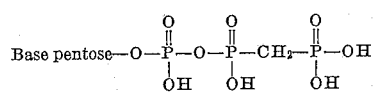 (IX)

can be prepared by the substitution of

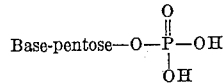

for the adenosine monophosphate in the above example for reaction with

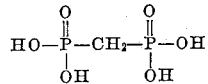

SYNTHESES II

The analogs of di- and triphosphates can be synthesized also by the reaction of a nucleoside phosphate or phosphonate with a phosphonic acid or phosphoric acid or derivative thereof in the presence of a condensing agent such as dicyclohexylcarbodiimide as represented by the following equations:

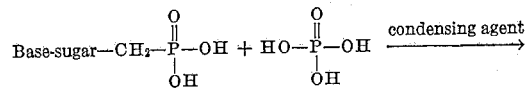

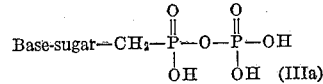 (IIIa)

or

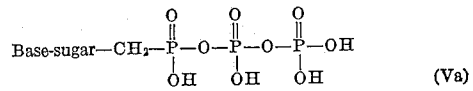

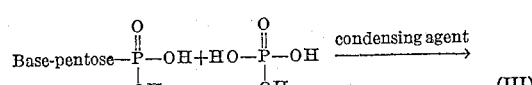 (Va)

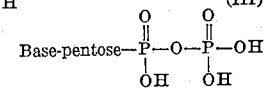

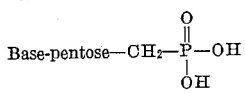 (III)

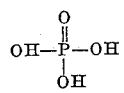

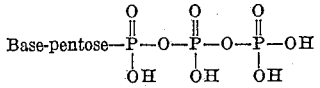 (V)

The reaction and conditions for reaction in Syntheses II are substantially similar to that set forth in Syntheses I with the exception of the substitution of phosphoric acid for a corresponding amount of the methylenediphosphoric acid on a molecular basis. The following is typical of the reactions achieved by the syntheses II. In the following, substitution for the adenosine-5'-monophosphate and the methylenediphosphonic acid in Example 1 is made in about the same molecular ratios as the corresponding compounds in the example:

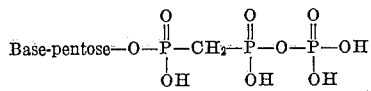

can be prepared by the substitution of

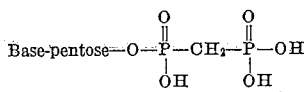

for the monophosphate for reaction with

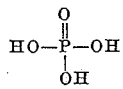

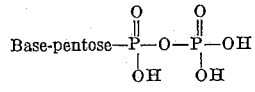 (III)

can be prepared by the substitution of

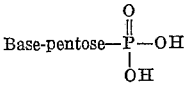

for the adenosine monophosphate for reaction with

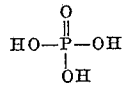

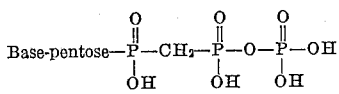 (VII)

can be prepared by the substitution of

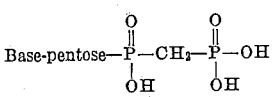

for the adenosine monophosphate for reaction with

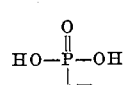

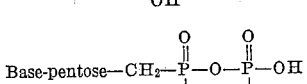 (IIIa) (a hexose)

can be prepared by substitution of

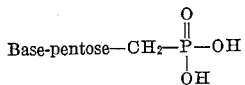

for the adenosine monophosphate for reaction with

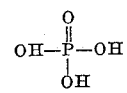

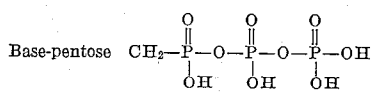  (Va)

can be prepared by substitution of

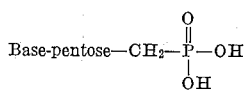

for the adenosine monophosphate for reaction with

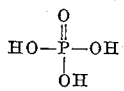

present in about twice the amount in Example 1.

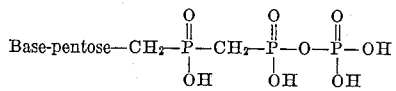  (VIIa)

can be prepared by substitution of

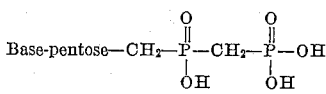

for adenosine monophosphate in Example 1 for reaction with

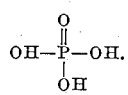

SYNTHESIS III

The third method of syntheses involves the reaction between a non-basic base sugar halide with a metal phosphonate derivative as represented by tribenzyl silver methylenediphosphonate followed by removal of the benzyl groups by a debenzylation reaction as represented by the following:

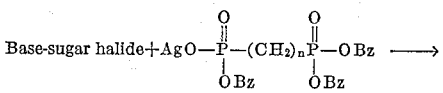

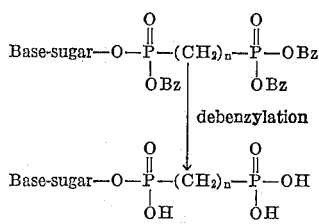

BZ=benzyl; $n$=a whole number from 1 to about 5

Example 2

PREPARATION OF SILVER TRIBENZYL METHEYLENE DIPHOSPHONATE

A stirred mixture of tetrasilver methylenediphosphonate (10 g. 0.0166 mole), 90 ml. of dry thiophene free benzene and (15 ml., 21.6 g., 0.127 mole) of benzyl bromide was refluxed for 6 hours. The silver bromide was filtered off and washed several times with benzene. After removal of the benzene at the water pump, the excess benzyl bromide was distilled off at 0.1 mm. with bath temperature 70°. The residual oil was taken up in ether and the ether solution was washed several times with sodium bicarbonate solution, then with water, then with saturated sodium chloride solution, dried over anhydrous sodium sulfate and concentrated to a jelly-like solid (7.72 g.). To this solid in 50 ml. of benzene there was added 8.7 ml. of N-methylmorpholine and the solution was refluxed for 2 hours. After removal of the benzene and the excess N-methylmorpholine at reduced pressure, the residual oily solid was washed 3 times by trituration with ether and then was treated with a solution of 4 g. of silver nitrate in 15 ml. of water plus 15 ml. of acetone.

The precipitate was filtered with suction, washed thoroughly with water and air dried. Yield 7.3 g., M.P. 125–130°. For purification, the solid was dissolved in 350 ml. of 95% ethanol and this solution was boiled for 2 or 3 minutes with a small amount of Norite. The Norite plus a considerable amount of undissolved material was filtered off, and the filtrate concentrated to 150 ml. On standing at room temperature silver tribenzyl methylenediphosphonate crystallized in a cotton-like mass, M.P. 148–149°. Yield: 3.9 g. (41%).

*Analysis.*—Calcd. for $C_{22}H_{23}O_6P_2A$:Ag, 19.5; P, 11.2. Found: Ag, 18.9; P, 11.13.

PREPARATION OF TRIBENZYL URIDINE-5'-METHYLENEDIPHOSPHONATE

A suspension of silver tribenzyl methylenediphosphonate (116 mg. 0.21 nM) with a solution of 5-deoxy-5'-iodo-2',3'-isopropylidineuridine (116 mg. 0.33 nM) in 1.5 ml. of dry benzene was gently refluxed for 90 minutes. The mixture was filtered and washed first with water, then with sodium thiosulfate solution, then with sodium bicarbonate solution and again with water. Evaporation of the dried ($Na_2SO_4$) benzene solution gave a colorless resin 80 mg. (57%).

PREPARATION OF BARIUM URIDINE-5'-METHYLENEDIPHOSPHONATE 100 mg. of resin obtained by the above procedure in 6 ml. of 95% ethanol plus 3 ml. of water was hydrogenated overnight at room temperature and atmospheric pressure in the presence of 2 mg. of palladium oxide and 2 mg. of palladium on charcoal. The catalyst was removed by centrifugation and concentrated almost to dryness. The residual solution was treated with excess barium hydroxide solution and precipitation of the barium salt was completed by the addition of 3 volumes of ethanol. The barium salt was purified by two reprecipitations at pH 6.5 after solution in .1 N HBr. Yield: 68 mg.

*Analysis.*—Calcd. for $C_{10}H_{14}O_{11}N_2P_2Ba$ ($4H_2O$): C, 19.6; H, 3.6; N, 4.6; P, 10.2. Found: C, 19.3; H, 3.4; N, 4.6; P, 10.4.

Instead of the tetra silver salts, of the tribenzyl methylenediphosphonate, use can be made of the corresponding alkali metal salts of potassium, sodium, lithium, or the alkaline earth metal salts including calcium, magnesium or barium, or the mercury of copper salts. The solvent component may comprise ethyl ether, toluene, dioxane, and the like and reaction can be carried out at room temperature up to a temperature of about 220° F.

The reactants are preferably employed in about equimolecular ratios but the halide can be employed in excess of about 100–200 percent. Instead of the iodide, use can be made of the chloride, bromide, or of the $—CH_2Cl$, $—CH_2Br$ or $—CH_2I$. The N-methylmorpholine, sodium iodide, lithium iodide, lithium chloride and calcium iodide, or other quaternary salts can be substituted by other debenzylating agents well known to the art. Instead of protecting the phosphate or phosphonate with benzyl groups, other protective agents well known to the art can be used such as nitrobenzyl groups and the like.

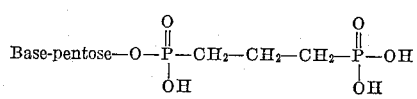

can be prepared by substitution of

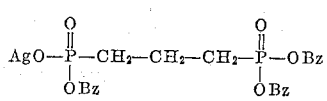

for the

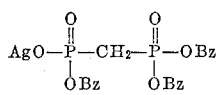

in the foregoing example.

SYNTHESES IV

The analogs can further be prepared by the condensation reaction of a base sugar hydroxide with a halogen anhydride of phosphonic acid as represented by the reaction

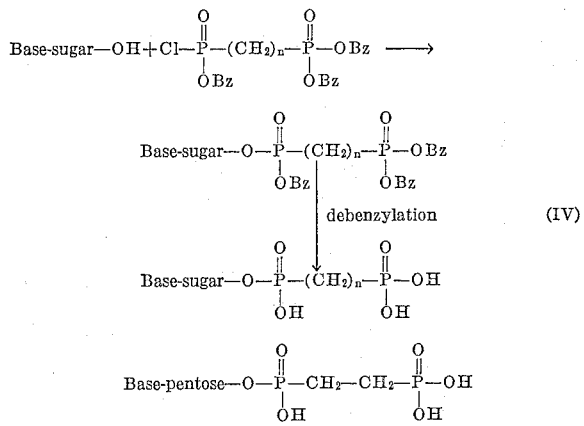

can be prepared by the substitution of the base-pentose for the 2′,3′-isopropylidine adenosine in corresponding amount on a molecular basis for reaction with

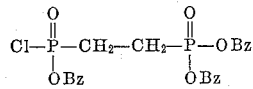

Example 3

PREPARATION OF TRIBENZYL METHYLENEDIPHOSPHONIC ACID

Gaseous hydrogen sulfide was passed into a solution of 930 mg. of silver tribenzyl methylenediphosphonate until precipitation of silver sulfide was complete. Most of the silver sulfide was centrifuged off and washed in the centrifuge tube with several small portions of chloroform. The combined supernatant and wash solutions were concentrated to a thin syrup which was extracted with four successive portions of warm ether (4 ml. each), the insoluble material being centrifuged off with each extraction. The combined ether extracts were concentrated to a volume of about 2 ml., whereupon a white solid formed from the solution. The solid was triturated with several portions of ether and air dried. Yield, 549 mg. (72%); M.P., 90–92°; neut. equiv., 418 (calculated 421).

Example 4

PREPARATION OF ADENOSINE-5′-METHYLENE-DIPHOSPHONATE

Phosphorous pentachloride (446 mg.) was added to a solution of tribenzyl methylenediphosphonic acid in 3 ml. of chloroform and the suspension was stirred for 30 minutes at room temperature. Gas evolution began immediately after the addition and after 10 minutes the solid phosphorous pentachloride had disappeared. The resulting solution was concentrated to dryness in vacuo and the flask containing the residual material was placed in a 30° water bath and evacuated overnight at .001 mm. in order to remove phosphorous oxychloride.

The resulting product (a glass) was treated carefully, with shaking, with pyridine solution of 2′,3′-isopropylidine adenosine (310 mg. in 4 ml. of pyridine), the flask being cooled in an acetone-Dry Ice bath during the addition. The resulting mixture was intermittently cooled for 4 hours in the acetone-Dry Ice bath in such a manner as to maintain a temperature just above the freezing point of the mixture and then was allowed to stand overnight at room temperature. Excess aqueous sodium carbonate (20%) was added and the solution was concentrated in vacuo to a syrup. The syrup was dissolved in 10 ml. of chloroform, and this solution was washed with very dilute sodium carbonate solution, then with water, then with saturated sodium chloride, dried over sodium sulfate and concentrated in vacuo to an oily solid material.

This material was twice dissolved in alcohol and the alcohol was evaporated in vacuo to remove traces of other solvents. The material resulting from this treatment was dissolved in 95 percent alcohol and hydrogenated with molecular hydrogen for 30 minutes at atmospheric pressure in the presence of Adam's palladium oxide catalyst. The catalyst was centrifuged off and the solution evaporated to dryness under reduced pressure. The residue was dissolved in 0.1 N dilute sulfuric acid (5 ml.) and the solution was allowed to stand at room temperature for two days in order to hydrolyze the isopropylidine grouping. The solution was neutralized with the theoretical amount of barium hydroxide and the barium sulfate was centrifuged off. The supernatant solution was concentrated in vacuo to a volume of about 1 ml. and the product was precipitated as the barium salt by the addition of excess 1 molar barium acetate solution. This preparation was washed with three portions of water, then redissolved in the minimum of 0.1 N HCl at 5° C., centrifuged from some solid material and reprecipitated at pH 6 by the addition of 0.1 N NaOH solution. This solid was washed with three portions of water, then with two portions of 95 percent ethanol, then with ether, and dried for 12 hours over $P_2O_5$ at 0.1 mm. to yield 250 mg. of a clean white solid. A portion was triturated with 1 percent ammonium sulfate, the barium sulfate was removed by centrifugation and the supernatant examined on paper chromatograms. This procedure produced a single spot in disodium hydrogen phosphate (5) isoamyl alcohol, $R_f$ .78.

*Analysis.*—Calcd. for $C_{11}H_{15}O_7P_2N_5Ba(4H_2O)$: C, 22.0; H, 3.9; N, 11.7; P, 10.3. Found: C, 21.7; H, 4.1; N, 11.9; P, 10.1.

Example 5

PREPARATION OF 5′-DESOXYURIDINE 5′-PHOSPHONIC ACID

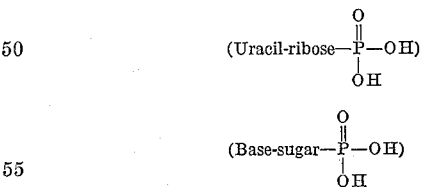

Anhydrous hydrogen bromide is passed into a solution of 10.0 grams of diethyl 5′-desoxy-2′,3′-O-isopropylideneuridine 5′-phosphonate in 50 ml. of anhydrous benzene for 12 hours at a temperature of 25° C. The solvent is removed at reduced pressure and the glassy residue is treated with 50 ml. of water and then the mixture is concentrated to dryness at reduced pressure and at a temperature of 20° C. The latter procedure is repeated four times. The dry residue is treated with excess 0.05 N sodium hydroxide solution and the product is absorbed from the resulting mixture onto an ion exchange resin such as Dowex-1 (Formate) marketed by the Dow Chemical Company of Midland, Michigan. The resin is washed exhaustively with water and the product was eluted with 4 N formic acid. The formic acid elute is concentrated to dryness at reduced pressure. The residual material is dissolved in water and the product purified by adsorption onto charcoal at pH 2, washing charcoal with water and elution with 5% ammonia in 50% methanol. The elute is concentrated to dryness at reduced pressure and the residue is dissolved in water and dried at reduced pressure. After repeated treatment with water a product 5'-desoxyuridine 5'-phosphonic acid is secured as the ammonium salt. The ammonium salt can be converted to the free acid by treatment of the solution of the ammonium salt with excess hydrogen form of ion exchange resin. The product has a uracil to phosphorous ratio of 1:1 and a titration curve similar to that of uridine 5'-monophosphate except that the pK of the secondary phosphonate grouping was approximately 0.7 unit higher than the analogous secondary phosphate grouping in uridine 5'-monophosphonate.

*Example 6*

PREPARATION OF 5'-DESOXYURIDINE-5'-METHYL-PHOSPHONIC ACID

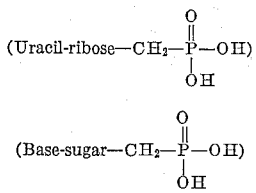

A solution of 25 grams of diphenyl methylphosphonate in 100 ml. of anhydrous tetrahydrofuran is treated with excess sodium hydride and the mixture is refluxed for 36 hours under a nitrogen atmosphere. The mixture is filtered under nitrogen and the filtrate is treated with 10 grams of 5'-desoxy-5'-iodo-2',3'-O-isopropylidineuridine in tetrahydrofuran solution. The resulting mixture is refluxed for 3 hours. The solvent is distilled off and the residue dissolved in ether. The solution is extracted with water, with dilute sodium thiosulphate solution and again with water, dried over sodium thiosulphate solution and concentrated to dryness. The residue is treated with 100 ml. of 10% ammonia in 95% ethanol and the mixture is allowed to stand at room temperature with occasional shaking for 60 hours. The mixture is concentrated to dryness and the residue is treated with excess .1 N sulphuric acid and then allowed to stand for 24 hours at 20° C. The solvent is removed at reduced pressure and the product is isolated from the residue by use of an ion exchange resin (Dowex-1) and charcoal as described in Example 6.

The product 5'-desoxyuridine-5'-methylphosphonic acid has a uracil to phosphorous ratio of 1:1 and a titration curve similar to that of uridine 5'-monophosphonate except that the pK of the secondary phosphonate is 0.7 unit higher than that of the analogous secondary phosphate grouping in uridine-5-monophosphonate.

*Example 7*

PREPARATION OF ADENOSINE 5'-METHYLENE-DIPHOSPHONATE

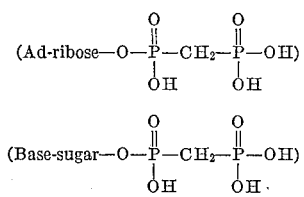

Methylenediphosphonic acid (10 g., 60 mmoles) and 2',3'-isopropylidene adenosine (12.48 g., 40 mmoles) were dissolved in dimethyl formamide (130 ml.) containing tri-n-hexylamine (9.32 g., 34.54 mmoles). To this solution, trichloroacetonitrile (80 ml., 800 mmoles) was added and the mixture was stirred until a clear solution was obtained. The solution was heated (70–80°) with stirring for three hours during which time a small amount of solid precipitated and the solution developed a yellow color. The reaction mixture was cooled to room temperature, the insoluble material filtered off with suction and the yellow filtrate was evaporated at reduced pressure to a volume of 130 ml. The solid which precipitated on evaporation was filtered off and the filtrate treated with $H_2SO_4$ (5 N, 250 ml.) in a separatory funnel. A cloudy solution was obtained which separated into two phases on standing overnight (12 hours) at room temperature. The bottom phase was a heavy brown oil while the top phase (aqueous) was essentially colorless. The solution (360 ml.) contained 280,000 optical density units (at 260 m$\mu$) corresponding to 18 mmoles of adenine. The oil layer was separated and extracted with water (three times, a total of 100 ml.), the water washings were added to the aqueous (top) layer and the total solution was diluted to one liter.

The solution was treated with acid washed charcoal (Norite A) (100 g.) in four parts. During this treatment the optical density of the solution dropped to 2.5. The Norite was thoroughly washed with water (ca. 15 liters) until no precipitation was observed upon treatment of the washings with aqueous silver nitrate solution. Elution from the charcoal was accomplished using 10% ammonium hydroxide (by volume) in 50% ethanol in one liter batches. A total of ten liters of the eluding solution was used. The combined eluates were evaporated under reduced pressure at 30° to 500 ml. and then filtered to remove traces of charcoal. This gave a slightly yellow solution (optical density units 186,000).

The solution was further concentrated to 20 ml., made basic (pH 8–9) with 10 N NaOH and then passed through a Dowex-1 (formate) ion exchange resin column (5 x 60 cm.) at a rate of about 1 ml. per minute. After washing the column with water, (3000 ml., optical density units 54,000) tractionation was carried out at a rate of 4 ml. per minute using 6 N formic acid as the eluting medium. Ten milliliter fractions were collected. The optical density of each fraction was determined at 260 m$\mu$. Two major ultra-violet absorbing peaks were obtained: Peak (I), fractions 71–91, total optical density units 10,000; peak (II), fractions 108–204, total optical density units 98,000.

The solution containing peak (I) was concentrated to a white ultra-violet absorbing solid containing $p^1,p^2$-diadenosine 5'-methylenediphosphonate.

The solution containing peak (II) was evaporated under reduced pressure at 30° to a white solid. The solid was dissolved in water and the solution re-evaporated in order to remove traces of formic acid. This procedure was repeated three times. The solid was again dissolved in water and lypholyzed to a white powder which was recrystallized from water as clusters of colorless needles (3.08 g., 18%). Paper chromatograph in a number of solvent systems gave a single spot. The product gave a positive reaction when the chromatograms were sprayed with the periodate-benzidine spray.

*Analysis.*—Calcd. for $C_{11}H_{17}N_5O_9P_2$: C, 31.06; H, 4.04; N, 16.47; P, 14.57. Found: C, 30.93; H, 4.15; N, 16.66; P, 14.77.

*Example 8*

PREPARATION OF ADENOSINE-5'-METHYLENEDI-PHOSPHONO-P²-PHOSPHATE

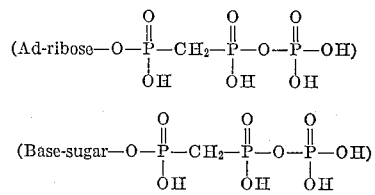

Adenosine-5'-methylenediphosphonate (840 mg., 2 mmoles) and 85% phosphoric acid (2.32 g. 20 mmoles) were dissolved in pyridine (40 ml.) containing tri-n-hexylamine (10 ml., 21 mmoles) and treated with dicyclohexyldicarbodiimide (20.6 g., 100 mmoles) at room temperature for 48 hours. The precipitated dicyclohexylurea was filtered off and washed thoroughly with water. The combined filtrate and washings were further diluted with water (100 ml.) and extracted with ether three times (300 ml.). The ether solution was washed with a small amount of water and the combined aqueous solution concentrated in a flash evaporator at 30°. Water was added to the concentrate (ca. 50 ml.) and the solution re-evaporated. This was repeated four times. The resulting concentrate was dissolved in water (200 ml.) and made acid using HCl (5 N). Acid-washed Norite A (60 g.) was added with stirring to the solution in 10 g. batches. After collecting the Norite, it was washed with water (total volume used, 5 liters). The nucleotide derivatives were then eluted with 50% aqueous ethyl alcohol containing 2% of concentrated ammonia solution (s.g. 0.9) (total volume of eluate, 1000 ml.). Concentration of the eluate in a flash evaporator (bath temperature, 30°) gave a neutral solution which was freed from a trace of charcoal by centrifugation. The solution was further concentrated to 20 ml. and then adjusted to pH 8 with 1.0 N sodium hydroxide solution. The recovery of nucleotides at this stage, as estimated spectrophotometrically, was 50% of theoretical (14,700 optical density units).

The solution was adsorbed onto a Dowex-2 (chloride) ion exchange column (2.5 x 63.5 cm.). After a water wash (750 ml.), elution was performed with 0.003 N hydrochloric acid containing the indicated amount of lithium chloride: (1) 0.003 N HCl+0.05 M LiCl (900 ml.), (2) 0.003 N HCl+0.075 M LiCl (1000 ml.). A total of 1659 optical density units were eluted. These eluates were discarded. Final elution was carried out using a gradient technique (0.003 N HCl+0.075 M LiCl in the mixing chamber and 0.003 N HCl+0.15 M LiCl in the reservoir) at an average flow rate 5 ml. per minute, with ten ml. fractions being collected. The optical density of each fraction was determined at 260 m$\mu$. Two major ultra-violet absorbing peaks were obtained: peak (I), fraction 150–207, total optical density units 1270; peak (II), fractions 230–325, total optical density units 4,710.

Peak (I) was neutralized with 2 N lithium hydroxide solution and then the solution was concentrated to a syrup under vacuum. The syrup was dissolved in minimum amount of water and lypholyzed to a white solid. The solid was thoroughly triturated with dry methanol. The insoluble material was separated and redissolved in minimum amount of water. Upon addition of methanol a white amorphous solid separated which was centrifuged out and washed with methanol. On paper chromatography, this product gave single spots in a number of solvent systems, which corresponded exactly with those of adenosine-5' methylenediphosphonate (10 mg.).

Peak (II) was treated in a similar manner to give the desired product as a white powder (152.5 mg., 14.4% based on adenosine-5' methylenediphosphonate). This product upon paper chromatographically in several solvent systems gave a single well defined spot. These chromatograms gave a positive reaction when sprayed with the periodate-benzidine spray.

*Analysis.*—Calcd. for $C_{11}H_{18}N_5O_{12}P_3 \cdot 4H_2O$: C, 21.96; H, 3.66; N, 11.65; P, 15.54. Found: C, 21.66; H, 3.52; N, 11.65; P, 5.60.

The compounds prepared in accordance with the practice of this invention have been found to have considerable utility. Since many of the established reactions of nucleoside phosphates are those of formation or cleavage of the phosphate linkages, syntheses of nucleoside polyphosphates such as the mono-, di- and triphosphates having one or more of the ester or pyrophosphate oxygen atoms replaced by a methylene or other aliphatic function are of particular interest because of the greater stability of the methylene tie-in of the phosphonates.

The phosphonic acid analogs of the nucleoside phosphates prepared in accordance with the practice of this invention have been found to have physical and chemical properties similar to those of the parent phosphates or polyphosphates with the exception that the C—P bonds are extremely resistant to cleavage.

By way of a specific illustration of utility, it is known that the natural members of the adenosine series, namely, adenosine monophosphate, adenosine disphosphate, and adenosine triphosphate, produce a lowering of blood pressure in the cat anesthetized with nembutal. In this series, as the number of phosphate groups is increased, the blood pressure lowering effect is also increased. The relationship between the activity and the number of phosphate groups in the 5' position seems to suggest participation of the phosphate side chain in the mechanism which produces the blood pressure response.

The 5'-adenylmethylenediphosphonate, prepared in accordance with the practice of this invention, may be compared to adenosine triphosphate, the most active of the aforementioned series. The highest pK's of the analog are 4.1 and 7.5 in 0.2 molar sodium chloride as against 4.0 and 6.5 for adenosine triphosphate. This indicates that the analog can complex metal more strongly than adenosine triphosphate.

The P—C bond of the phosphonic acid analog is stable by comparison with that of adenosine triphosphate and thus resists cleavage in the organism while the O—P bond of the phosphate is labile and easily hydrolyzed.

The analog is sufficiently similar to the parent co-factor adenosine triphosphate to act as an inhibitor in the processes involving cleavage of the terminal pyrophosphate bond of adenosine triphosphate, or as an alternate substrate in processes involving cleavage of the second pyrophosphate bond, or as an alternate substrate in processes involving complex formation as with metal ions in which no cleavage of pyrophosphate bonds occur.

The potency of members of the adenosine triphosphate series was compared with that of 5'-adenylmethylenediphosphonate using the fall in arterial pressure in the cat. A standard dose of ATP was used and the amount of analog used to produce the same fall in arterial pressure was determined. It was found that the analog is at least 50 percent more potent in depressing the arterial pressure in the cat by comparison with ATP. It is 400 percent more potent that adenosine monophosphate. It is believed that the mechanism of the improved action of the analogs embodying the features of this invention may be due to binding to the receptor site or to a metal without cleavage of the chain. The greater activity of the analog might also be accounted for by reason of a decreased rate of destruction or to a greater affinity for the receptor site.

In brief, the replacement of the terminal pyrophosphate oxygen of ATP with a methylene function has been found to result in a compound having considerably greater blood pressure lowering properties than ATP. The increase in activity may be related to an increased binding of the compound to receptor sites or to a metal as the methylene group is substituted for the pyrophosphate oxygen of the naturally occurring compound.

It will be understood that changes may be made in the details of construction, formulation and compositions without departing from the spirit of the invention, especially as defined in the following claims.

I claim:
1. A phosphonic acid analog of a nucleoside phosphate selected from the group consisting of analogs of a monophosphate, and of polyphosphates in which at least one of the bridging oxygens of the phosphates is replaced by an alkylene group, in which the bridging oxygen is selected from the group consisting of an ester oxygen and a pyrophosphate oxygen and in which the analog of the monophosphate is

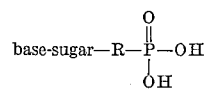

the analog of the diphosphate is selected from the group consisting of

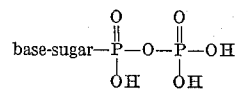

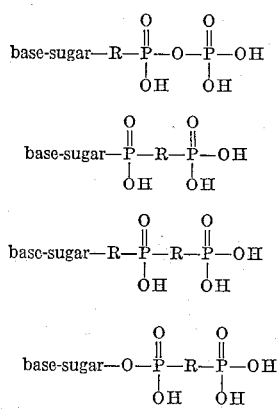

and in which the analog of the triphosphate is selected from the group consisting of

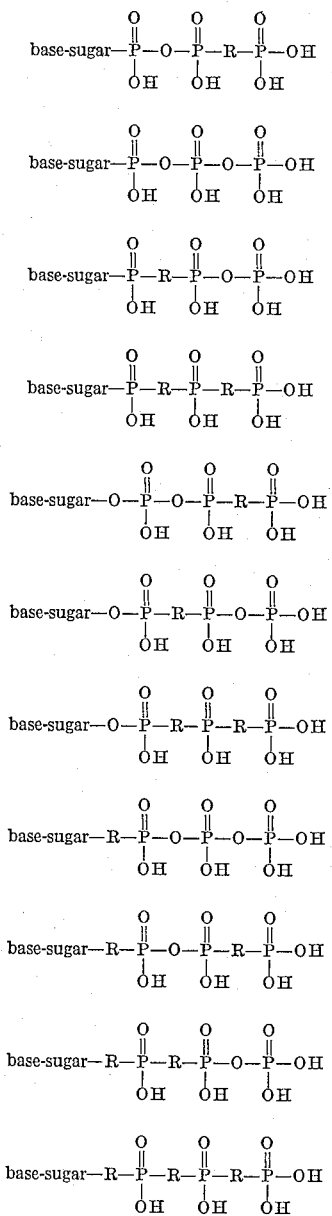

wherein R is an organic alkylene group and wherein sugar-P and R—P indicate a direct C—P bond and in which the base is selected from the group consisting of a purine and pyrimidine base and wherein, when the base is purine, the sugar phosphonate is attached to the $C_9$ position.

2. A phosphonic analog as claimed in claim 1 in which R is —$CH_2$—.

3. The method of producing a phosphonic acid analog of a nucleoside phosphate comprising the steps of reacting a nucleoside monophosphate with a lower alkylene diphosphonic acid in the presence of a condensing agent in accordance with the following equation

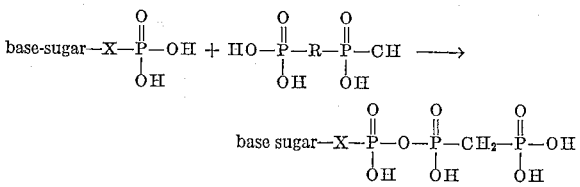

in which X is a group selected from the group consisting of oxygen and a lower alkylene group and R is a lower alkylene group.

4. The method of producing a phosphonic acid analog of a nucleoside phosphate comprising the steps of reacting a compound having the following formulation

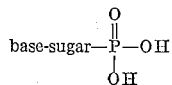

with a compound selected from the group consisting of phosphoric acid and phosphonic acid in the presence of a condensing agent and wherein the base is selected from a group consisting of a purine and pyrimidine base.

5. The method of producing a phosphonic acid analog of a nucleoside phosphate comprising the steps of reacting a nucleoside halide having the formula

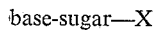

in which X is a halide with a metal salt of a phosphonic acid the formula

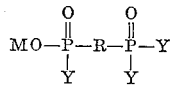

in which M is a metal, R is a lower alkylene group, and Y is an ether blocked hydroxy group, and in which the base is selected from the group consisting of a purine and pyrimidine base.

6. The method of producing a phosphonic acid analog of a nucleoside phosphate comprising the step of reacting a nucleoside-OH having the formula

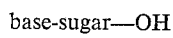

with a phosphonic acid halide having the formula

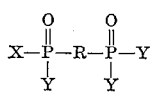

in which X is a halogen, R is a lower alkylene group, and Y is an ether blocked hydroxy group, and in which the base is selected from the group consisting of a purine and pyrimidine base.

7. The method of producing a phosphonic acid analog of a nucleoside phosphate comprising the steps of reacting a compound having the formula

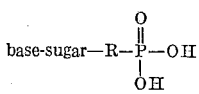

in which R is a lower alkylene group, with a compound selected from the group consisting of phosphoric acid and phosphonic acid in the presence of a condensing agent and wherein the base is selected from the group consisting of a purine and pyrimidine base.

References Cited by the Examiner

Bannister et al.: "Jr. Am. Chem. Soc.," 82, 3363–8, July 5, 1960.

Flesher et al.: "Nature," March 12, 1960, vol. 185, pp. 772–773.

Khorana: "Some Recent Developments in the Chemistry of Phosphate Esters of Biological Interest," 1962, pp. 36, 39, 76, 102–103 and 114, John Wiley and Sons, Inc., New York, N.Y.

Parikh et al.: Jr. Am. Chem. Soc., 77, 2386, 8, May 5, 1955.

Parikh et al.: Jr. Am. Chem. Soc., 79, 2778–81, June 5, 1957.

LEWIS GOTTS, *Primary Examiner.*

A. LOUIS MONACELL, *Examiner.*